Jan. 21, 1930.  F. C. COLL  1,744,106
CONVEYER
Filed Nov. 22, 1927  2 Sheets-Sheet 2

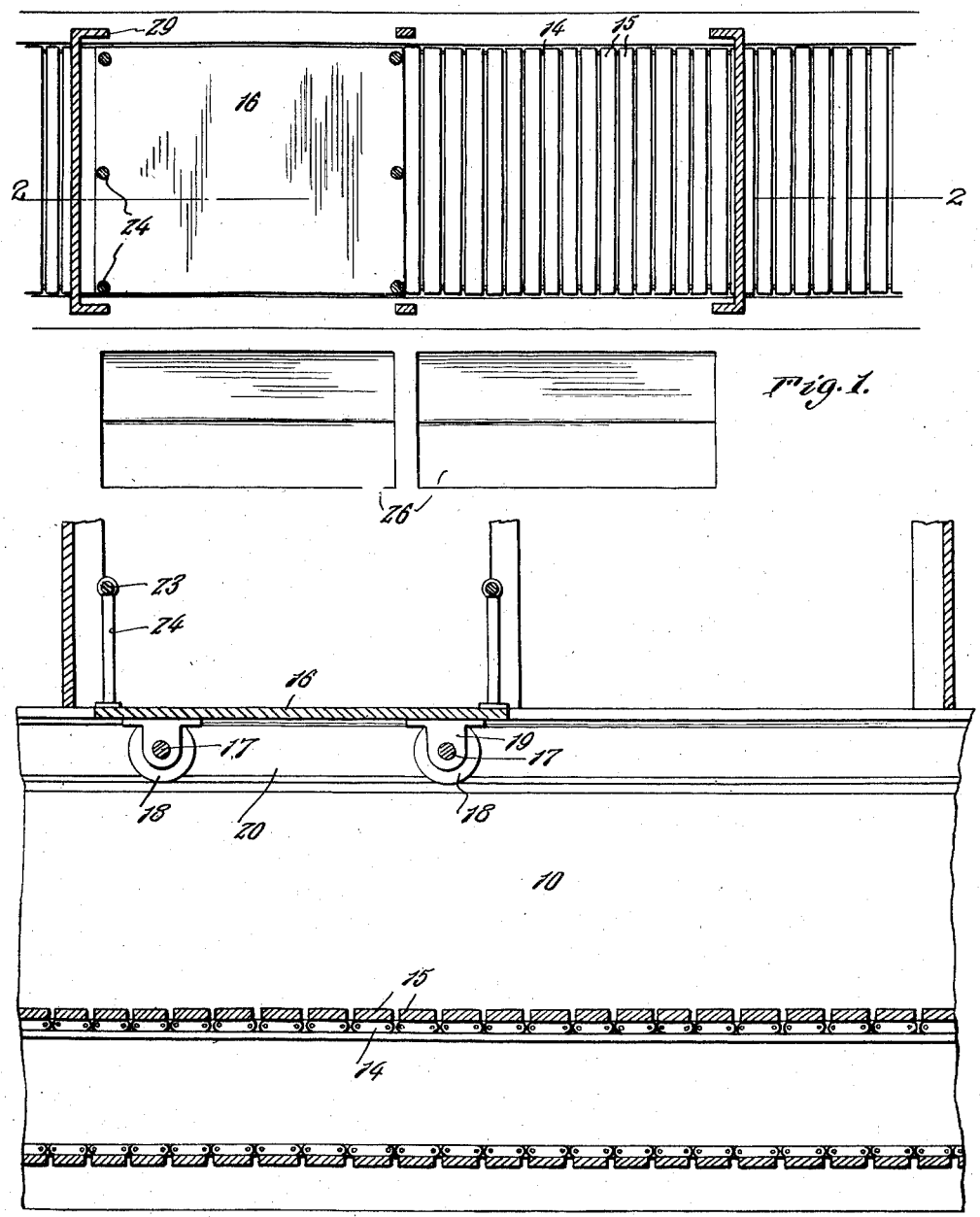

Inventor
F. C. Coll
By Victor J. Evans
Attorney

Patented Jan. 21, 1930

1,744,106

UNITED STATES PATENT OFFICE

FREDERICK C. COLL, OF SANTURCE, SAN JUAN, PORTO RICO

CONVEYER

Application filed November 22, 1927. Serial No. 235,061.

This invention relates to conveyers and particularly to devices in connection therewith to facilitate the dumping of loads thereon.

Objects of the invention are to facilitate the bringing of carts, wagons, etc., to position for dumping and to facilitate the dumping of the cart upon a conveyer, or other receptacle arranged in a pit or channel.

Other objects are simplicity, and cheapness of construction, durability, and simplicity and convenience of operation.

Other objects and advantages will appear from the following specification and claim, and I do not wish to be limited in the scope and application of the principles of my invention except as I shall be limited by said claim.

In the drawings:

Figure 1 is a plan view of the invention with parts omitted for clearness.

Figure 2 is a fragmentary section on lines 2—2 of Figure 1.

Figure 3:
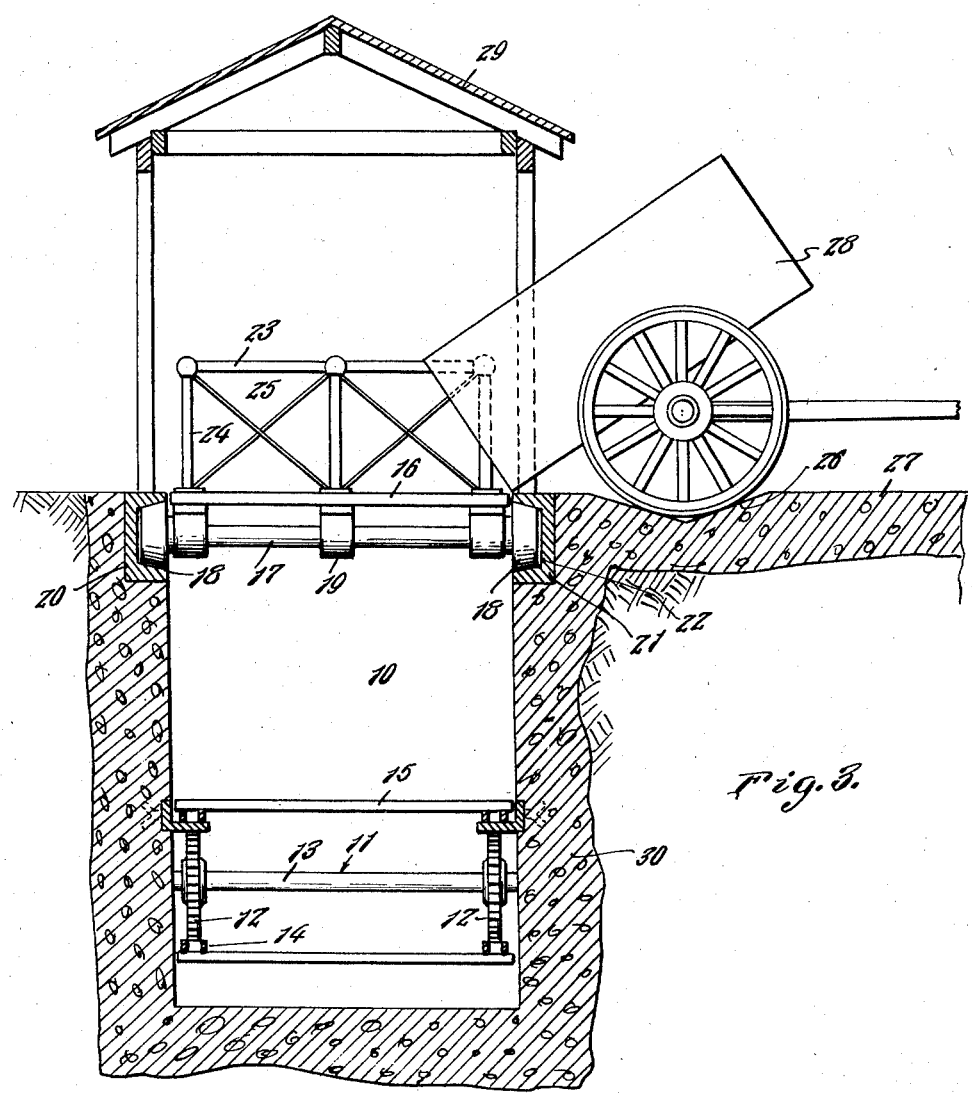
Figure 3 is a sectional view of right angles to Figure 2 looking down the pit or channel.

Referring to the drawings in detail, 10 designates a conveyer pit in which is located the conveyer 11 which consists of sprocket wheels 12 mounted on a shaft 13, said sprocket wheels being arranged at each end of the channel or shaft about which are trained the endless chain construction 14 illustrated in Figure 2 of the drawings and which chains are secured to a movable platform 15 consisting of a plurality of boards or the like extending transversely and connecting with the chains on both sides of the shaft. This mechanism may be power driven or be propelled in any suitable manner and constitutes no part of my invention.

In the dumping of carts or the like, into pits of this kind, great difficulty has been experienced in backing the truck or cart up to the pit and in suitably spacing them for properly dumping the material from the cart or truck into the pit. Where animals are used they are likely to become fractious and in case of motor trucks there is danger of backing over the edge due to imperfect working of the clutch or for other causes. In order to overcome these difficulties and others which arise in connection therewith, I provide a platform or bridge 16 having shafts 17 secured thereto by means of depending journal boxes 19 in which said shafts are rotatably mounted. On the ends of the shafts are mounted wheels 18 which ride on tracks consisting of two channeled iron members 20 and 21, one on each side of the pit and extending longitudinally thereof, the inner faces being flush with the side of the pit and the upper surface being flush with the ground and having the channeled face outward. The wheels are received snugly in said channels so as to prevent dislocation from the track.

Secured to the platform are rails 23 connected therewith by uprights 24 and braced by cross members 25. These rails serve to guide an animal onto the platform and across the same and also afford suitable means for moving the platform along the track to a different position when it is desired to dump a cart, that has passed thereover, into the pit. Located adjacent one side of the pit are depressions 26 formed in the roadbed which may be concrete or other suitable material as shown at 27. This depression is formed at a distance from the pit convenient for the cart or truck to readily ride thereinto without spilling the material on the side of the pit.

The dumping depressions are preferably arranged in pairs as shown in Figure 1, however there may be any suitable number of these depressions arranged along the pit depending on the length of the pit and of the conveyer belt therein. A cart is shown in position for dumping at 28 in Figure 3 of the drawing. A roof or shed 29 may be provided over the pit and extends the entire length thereof, or may be provided merely over the dumping position, the purpose of such a roof being of course a matter of shelter and protection to the pit. The pit may be surrounded by concrete walls 30 as shown in Figure 3 of the drawing.

The operation of the device is as follows:

When it is desired to dump a cart or truck into the pit, the same is run along the roadway and over the platform 16 to the depressions 26 as shown in Figure 3, whereupon the platform is moved to the adjoining location as shown in Figure 1 and the car or truck body is turned back to dumping position as shown in Figure 3. In the meantime, another cart or truck may be driven across the platform and the platform rolled to a third position or if the cart in the first position has been dumped, rolled back to the first position. In this manner, it will be seen that danger of an animal running over the side of the pit or being backed up to the pit, the driver in bringing his cart to the proper position is avoided. Likewise the difficulty of backing a motor truck over the edge is prevented in case the clutch or the brake mechanism does not work. In such cases it is often necessary for the driver to stop his car or truck at a distance from the pit for dumping. These disadvantages are overcome by my invention.

Having thus described my invention, what I claim is:

In combination, a conveyer pit with depressions formed in the surface above the pit and laterally thereof, channel members disposed in the side walls of the pit and being flush with said surface, said channel members cooperating to provide track ways, a platform, journal boxes depending from said platform, shafts journaled through said journal boxes, wheels mounted on the ends of the shafts and received by the track ways for movement thereon, uprights rising from the platform, rails between the uprights, bracing means for the rails and uprights, a shelter above the pit, said depressions being adapted to receive the wheels of vehicles dumping material in the pit and said platform being adapted to allow for the passage of vehicles over the pit.

In testimony whereof I affix my signature.

FREDERICK C. COLL.